United States Patent
Kostylev et al.

[15] 3,685,597
[45] Aug. 22, 1972

[54] DEVICE FOR MAKING HOLES IN THE GROUND BY PACKING THE LATTER

[72] Inventors: Alexandr Dmitrievich Kostylev; Konstantin Stepanovich Gurkov; Nikolai Grigorievich Nazarov; Khaim Berkovich Tkach; Alexandr Ivanovich Demin; Dmitry Ivanovich Vorobiev, all of Novosibirsk, U.S.S.R.

[73] Assignee: Institut Gornogo Dela Sibirskogo Otdelenia AN, Novosibirsk, U.S.S.R.

[22] Filed: March 18, 1970

[21] Appl. No.: 20,660

[52] U.S. Cl............................................175/19, 175/62
[51] Int. Cl. .............................................E21b 11/02
[58] Field of Search.........................175/19, 92, 105

[56] References Cited

UNITED STATES PATENTS

| 3,137,483 | 6/1964 | Zinkiewicz | 175/19 |
| 3,474,873 | 10/1969 | Zygmunt | 175/19 |
| 3,554,303 | 1/1971 | Zajkowski | 175/19 |

FOREIGN PATENTS OR APPLICATIONS

| 30,283 | 9/1922 | Denmark | 175/19 |
| 693,404 | 9/1964 | Canada | 175/19 |

*Primary Examiner*—Marvin A. Champion
*Assistant Examiner*—Richard E. Favreau
*Attorney*—Waters, Roditi, Schwartz & Nissen, Alan K. Roberts and Julian H. Cohen

[57] ABSTRACT

A device for making holes in the ground by packing the latter, comprising a cylindrical housing with a pointed front portion on which there is mounted a tapered reamer introduced into the ground under the effect of impact delivered by a reciprocating striker accommodated in the housing.

3 Claims, 4 Drawing Figures

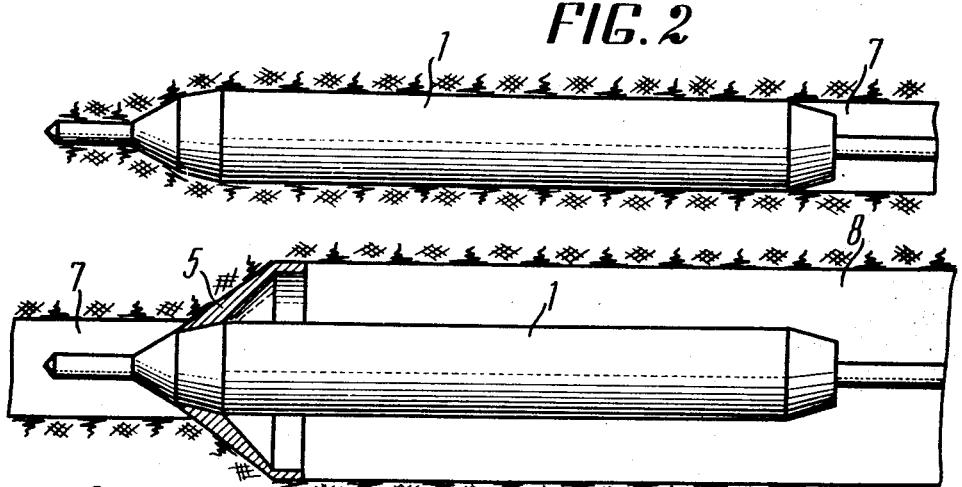
FIG. 2
FIG. 3
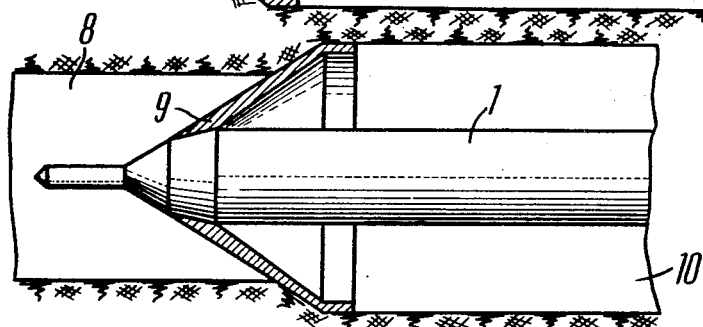
FIG. 4

DEVICE FOR MAKING HOLES IN THE GROUND BY PACKING THE LATTER

The present invention relates to apparatus for making holes in the ground by packing the latter and the apparatus can be used to advantage in trenchless laying of pipes, electric and telephone cables, etc.

Widely known in the art is apparatus of the above type which comprise a striker accommodated in a cylindrical housing with a pointed front portion, performing a reciprocating motion and delivering impact to the housing, the latter intruding into the ground and forming a hole therein.

In order to make holes of large diameters, a tapered reamer is usually secured on the shank portion of the housing. In the case of soft ground, a hole is made with a reamer in one run, whereas in the case of hard ground sinking is effected first without a reamer and then with the latter.

As is well known, the main dynamic load in these devices is taken up by the housing. When securing the reamer in the shank portion of the housing, it develops additional stresses due to the resistance of the ground being packed and acting upon the reamer.

Therefore, such a position of the reamer on the device housing is impractical.

Moreover, the known devices allow for no more than two runs in one hole for reaming the latter, since the cohesion of the housing of the device with the ground will be impossible in subsequent runs due to the fact that, after a hole has been penetrated with a reamer, the hole diameter is greater than that of the housing.

Consequently, the size of holes to be made is limited as to their diameter, and more powerful devices are required in order to make holes of still larger diameters.

The main object of the present invention is to eliminate the effect of tensile loads upon the housing when employing a reamer.

Another object of the present invention is to make possible multiple penetration of holes for reaming them to a required diameter.

In accordance with the invention, a tapered reamer is arranged in the front portion of the housing and its angle of taper is less than the angle of friction of its material against the ground.

Another feature of the present invention consists in that on the front portion of the housing provision is made of an annular tapered portion whereon the reamer is set.

Presented hereinbelow is a detailed description of an exemplary embodiment of the present invention with due reference to the accompanying drawings, wherein:

FIG. 2 illustrates the position of the device of the invention in the hole, without a reamer; and FIG. 3 and 4 show the same device in the hole, with reamers of different diameters.

Figure 1:
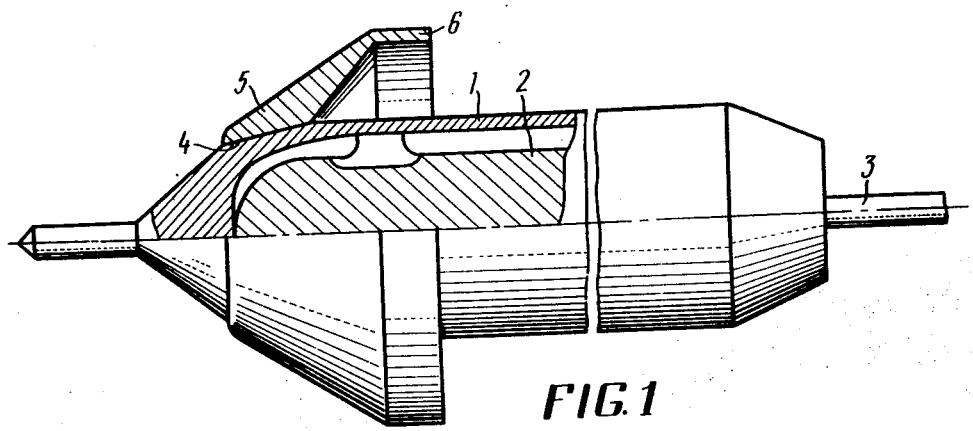
FIG. 1 is an elevational view, partly in section, of the proposed device with a reamer.

A cylindrical housing 1 (FIG. 1) with a pointed front portion accommodates a striker 2 adapted to perform reciprocation and to deliver impact upon the front portion of the housing 1. Reciprocation can be imparted to the striker 2 by various means, in particular, by compressed air supplied via hose 3.

In its front portion, the housing 1 is provided with an annular tapered portion 4 whereon a tapered reamer 5 is mountable. The angle of taper of the reamer is selected to be less than the angle of friction of the reamer against the ground and equal to approximately 8°–15°. This is required to guarantee the cohesion of the device with the ground throughout the reamer surface in the course of penetration.

In order to ensure a reliable cohesion of the device in soft ground, the reamer 5 includes a cylindrical guide or skirt 6 which is also instrumental in attaining the required cohesion of the device with the ground in the case of emergency reverse stroke removal of the device from the hole.

Reaming a hole by the device of the present invention is effected in the following order of succession.

First, a hole 7 (FIG. 2) is sunk by the device, without employing the reamer. Then, the reamer 5 (FIG. 3) is mounted on the front portion of the housing 1, and the initial hole 7 is reamed to the size of a hole 8 of a larger diameter. Then, the reamer 5 is replaced by a reamer 9 of larger diameter but with the same angle of taper, and the penetrated hole 8 is reamed to the size of a hole 10 of still larger diameter.

Such a successive reaming of the hole can be repeated many times.

Note should be made of the fact that, when reaming a hole, the cohesion of the device with the ground only takes place throughout the surface of the reamers 5 and 9.

Trial runs have shown a greater efficiency of the proposed device as compared with the prior art. Holes up to 500 mm in dia were made in the three successive runs.

We claim:

1. A device for making holes in the ground by packing the latter, said device comprising: a housing including a front point portion, an intermediate conical portion extending rearwardly from the pointed portion, and a cylindrical portion extending rearwardly from the conical portion, said conical portion and cylindrical portion merging at a common diameter, a striker slidably supported in said housing, means for reciprocally moving the striker in the housing to deliver impact to the front of the housing, and a tapered reamer having a conical inner surface which can be fitted on the intermediate conical portion of the housing, said reamer including a rearwardly extending cylindrical skirt.

2. A device as claimed in claim 1 wherein said reamer has a front outer surface which is tapered at an angle which is less than the angle of friction of the material of the reamer with the ground.

3. A device as claimed in claim 1 wherein said housing is constructed such that the striker delivers impact thereto at a location within the conical portion.

* * * * *